Oct. 9, 1951     O. B. SURBER     2,570,884
CLICK ATTACHMENT FOR FISHING REELS
Filed Nov. 29, 1948
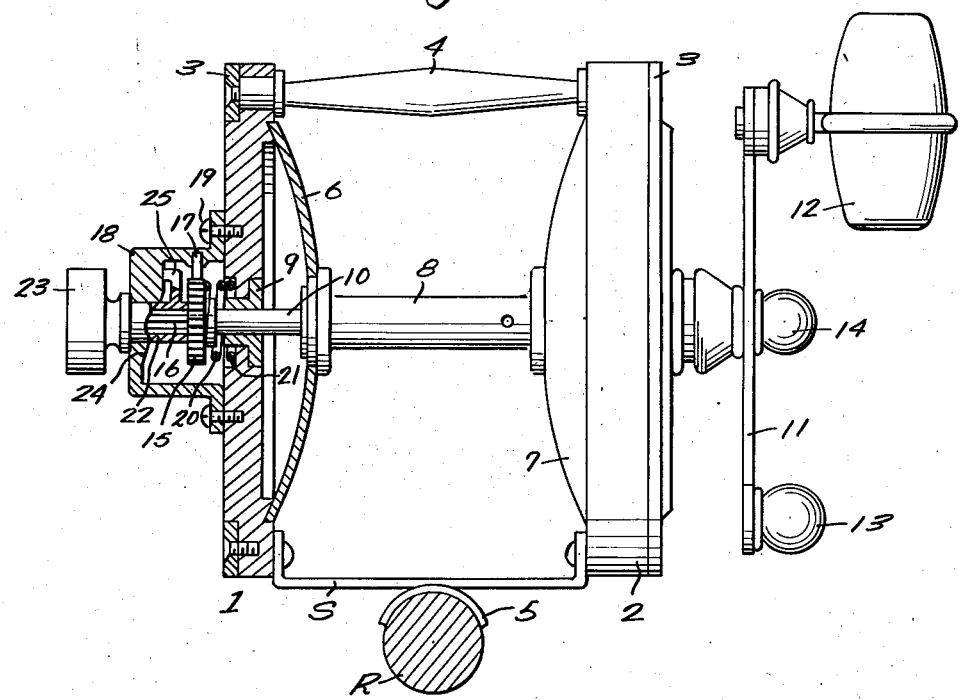
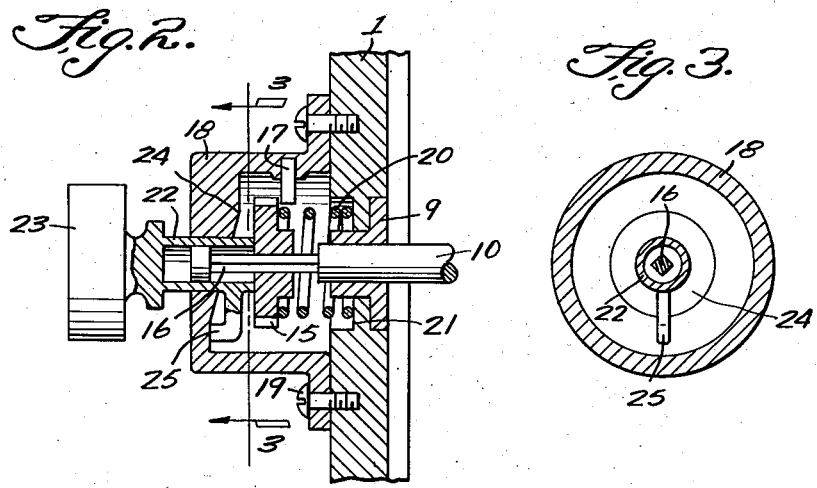
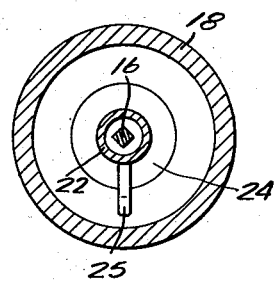
INVENTOR.
Otis B. Surber,
BY Victor J. Evans & Co.
ATTORNEYS Patented Oct. 9, 1951

2,570,884

UNITED STATES PATENT OFFICE 2,570,884

CLICK ATTACHMENT FOR FISHING REELS

Otis B. Surber, Los Angeles, Calif.

Application November 29, 1948, Serial No. 62,461

4 Claims. (Cl. 242—84.6)

My present invention relates to the general class of fishing reels and more particularly to improvements in the mechanical construction and arrangement of parts for operating the reel, and in construction and operation of the clicker or audible signalling device for the reel.

The primary purpose of the invention is the provision of mechanical structures of this type, which, due to the simplicity in construction and operation, may properly be operated and controlled by the average fisherman without fumbling, and with necessity for only minimum attention on the part of the fisherman, thus enabling him to devote the required attention to the catch.

A minimum number of parts are employed in the physical embodiment of the invention, which parts may be manufactured with facility and at low cost of production, and these parts may be assembled with convenience and installed in standard types of fishing reels with a minimum expenditure of time and labor.

The invention consists in certain novel features of construction and combinations and arrangements of parts as will hereinafter be described, and more particularly pointed out in the appended claims.

In the accompanying drawings I have illustrated a complete example of a physical embodiment of my invention wherein the parts are combined and arranged in accord with one mode I have devised for the practical application of the principles of the invention. It will however, be understood that changes and alterations are contemplated and may be made in these exemplifying drawings and mechanical structures within the scope of my claims without departing from the principles of the invention.

Figure 1 is a view partly in elevation and partly in section of a fishing reel in which my invention is embodied.

Figure 2 is an enlarged detail sectional view of the audible signal or clicking mechanism; and Figure 3 is a transverse sectional view at line 3—3 of Fig. 2.

In order that the general arrangement and utility of parts may readily be understood I have illustrated in Fig. 1 a typical fishing reel having two spaced circular heads 1 and 2 which may be made of molded plastic or other suitable material, and preferably the heads are reinforced by metallic wear rings at 3, 3, inset in the outer faces of the heads and secured thereto as by screws. The heads and their wear rings are rigidly united by cross braces or ties 4, and the reel is equipped with the usual spider S, and attaching flange or concavo convex plate 5 is utilized for mounting the reel upon the rod R in usual manner.

The inner faces of the two spaced heads 1 and 2 are recessed to accommodate the two flanges 6 and 7 of the spool 8, and the heads are equipped with centrally located metallic bushings, as 9, that provide bearings for the journals of the spool shaft 10 which is driven by transmission gearing located within the interior of the head 2, which together with the spool flange 7 forms a gear case.

The shaft 10, through the transmission bearing, and the spool, may be revolved through the use of a manually operated flat metallic crank arm 11, disposed transversely of and adjacent to the outer face of the reel head 2, and one end of the crank arm is provided with a swiveled hand knob 12, while the other end of the arm is equipped with a counterbalancing weight 13. A clamp nut 14 secures the crank arm to the rotary mechanism, and in addition to the transmission gearing within the head 2, the usual braking, and clutch mechanisms with free wheeling devices, are also mounted in the reel head; and the reel structure may be operated and controlled with facility in landing a catch, while the audible signal device may with equal facility be manipulated and controlled when necessary.

The clicker or clicking device employed as an audible warning that the line is unreeling from the spool, is mounted on the shaft 10 on the exterior face of the reel head 1, in position for convenient assembling of parts, and where it is readily accessible for use, and for removal if necessary for repairs or replacement. The audible signal or clicker includes a ratchet wheel 15 that is rotatable with and slidable on a reduced extension or square shaped end 16 of the spool shaft 10, which shaft projects through, and beyond the outer face of the circular head 1 of the reel, and a radially arranged spring blade 17, or noise maker, at its outer end or base is fixed or embedded in the molded plastic wall of a housing 18, so that the free end of this clicking blade or leaf spring coacts with the teeth of the rotatable ratchet wheel 15, for signaling purposes.

The housing, which is of rounded shape, is provided with an attaching flange that is secured, as by screws 19, to the exterior face of the reel head 1, and the housing encloses the ratchet 15. The ratchet is resiliently pressed outwardly by means of a coiled spring 20 interposed between the rotary ratchet wheel and a countersunk recess 21 in the outer face of the head 1; and as indicated the spring is coiled about a portion of the bearing bushing 9 and the shaft 10.

The spool shaft 10, beyond the ratchet, terminates in the reduced extension or square shaped end 16 that projects centrally into a cylindrical sleeve 22 that is slidable and partially rotatable in the outer wall of the housing, and this sleeve is provided with a flanged exterior hand knob 23 by means of which the clicking device may be controlled.

The inner end of the sleeve 22 bears against the adjoining face of the resiliently pressed ratchet, and the knob 23 may be turned and slidably moved to press or push the ratchet into clicking engagement with the clicker or leaf spring 17. For this purpose the inner face of the stationary housing 18 is fashioned with a cam face 24, arranged concentrically of the sleeve and shank, and the sleeve is provided with an integral, radially projecting and angular cam arm 25 for coaction with the cam face, as best seen in Figs. 2 and 3. By this arrangement of parts, the spring 20 at one side of the ratchet holds the ratchet in engagement with the clicker, and by turning the knob, the cam arm and cam face at the opposite side of the ratchet, hold the ratchet in engagement with the clicker.

To release the ratchet from clicking position the knob 23 is given a partial turn thereby swinging the cam arm 25 which rides down on the cam face 24, and permits the spring 20 to press outwardly the ratchet which slides on the shank 16 and out of engagement with the leaf spring or clicker 17.

By a reverse turn of the knob the clicker may again be restored to operative position; and in this combination and arrangement of parts, which permits a complete rotary movement of the parts or knob, as well as only a slight turning movement of the knob, the operator can readily and quickly correct any mistakes in his manipulation of the knob 23, and secure desired results.

Having thus fully described my invention, what I claim as new and desire to secure by Letters Patent is:

1. In a fishing reel including a rotary spool and its shaft, the combination with a ratchet wheel rotatable with and slidable on the shaft, of a housing enclosing the ratchet wheel, a spring blade forming a clicker and mounted in the housing for engagement with the ratchet wheel, resilient means for holding the ratchet wheel in clicking engagement, opposing means for holding the ratchet wheel against longitudinal movement, and manually operated means on said opposing means for releasing said opposing means so that the ratchet wheel will slide on said shaft from engaged to non-engaged position.

2. In a fishing reel including a rotary spool and its shaft, the combination with a ratchet wheel rotatable with and slidable on the shaft, a spring blade forming a clicker and a spring at one side of the ratchet wheel for holding it in operative engagement with said clicker, of a housing enclosing the ratchet wheel, means at the other side of the ratchet wheel for retaining it in engaged position, and manually operated means on said retaining means for releasing the retaining means so that the ratchet wheel will slide on said shaft into non-engaged position.

3. In a fishing reel the combination with a driven rotary shaft having a reduced square shaped end, and a spring pressed ratchet wheel rotatable with and slidable on the end, of an enclosing fixed housing and a spring blade mounted therein for engagement with the ratchet wheel, a rotary sleeve having a hand-knob and mounted in the housing for frictional engagement with the ratchet wheel, and means on said sleeve coacting with the housing movable to allow the sliding of the ratchet wheel from engagement with the clicker blade.

4. In a fishing reel including a rotary spool, the combination with a driven rotary shaft having a square shaped extension, a ratchet rotatable with and slidable on the extension, and a spring bearing against one side of the ratchet, of an enclosing housing for the ratchet and a spring blade mounted in the housing forming a clicker for engagement with the ratchet, a rotatable sleeve enclosing the extension and having its inner end in frictional contact with the other side of the ratchet, a hand knob rigid with the sleeve, a radially arranged cam arm rigid with the sleeve, and a cam face on an interior wall of the housing for coaction with the cam arm.

OTIS B. SURBER.

REFERENCES CITED

The following references are of record in the file of this patent:

UNITED STATES PATENTS

| Number | Name | Date |
| --- | --- | --- |
| 2,086,782 | Schafer | July 13, 1937 |